United States Patent

[11] 3,612,703

| [72] | Inventors | Kunio Irisawa<br>Tokyo-to;<br>Kazuo Saita, Kashiwa-shi, both of Japan |
|---|---|---|
| [21] | Appl. No. | 709,257 |
| [22] | Filed | Feb. 29, 1968 |
| [45] | Patented | Oct. 12, 1971 |
| [73] | Assignee | Mamiya Koki Kabushiki Kaisha<br>Bunkyo-ku, Tokyo-to, Japan |
| [32] | Priority | May 29, 1967 |
| [33] | | Japan |
| [31] | | 42/33694 |

[54] COMBINED SPOT AND AVERAGE PHOTOMETRIC SYSTEM
1 Claim, 7 Drawing Figs.

[52] U.S. Cl. ................................................ 356/219,
95/10, 356/222, 356/224
[51] Int. Cl. ................................................ G01j 1/42
[50] Field of Search ................................................ 356/219,
221, 222, 224, 225, 226, 227, 228, 233, 72, 73;
95/10 C

[56] References Cited
UNITED STATES PATENTS

| 2,058,532 | 10/1936 | Tuttle | 356/219 X |
| 2,302,597 | 11/1942 | Bing | 356/222 X |
| 2,959,092 | 11/1960 | Faulhaber | 356/219 X |
| 2,879,691 | 3/1959 | Faulhaber | 356/219 |
| 3,029,689 | 4/1962 | Cech | 356/219 |
| 3,103,150 | 9/1963 | Lange | 95/44 X |
| 3,177,762 | 4/1965 | Ito | 356/219 |
| 3,212,394 | 10/1965 | Norwood | 356/222 |
| 3,261,273 | 7/1966 | Broschke | 356/219 X |
| 3,383,981 | 5/1968 | Kawase et al. | 356/219 |
| 3,397,629 | 8/1968 | Mori et al. | 95/10 C |
| 3,425,328 | 2/1969 | Ichijo et al. | 95/10 C |
| Re.26,632 | 7/1969 | Norwood | 356/222 |
| 3,452,656 | 7/1969 | Ruhle et al. | 356/226 X |

Primary Examiner—William L. Sikes
Assistant Examiner—Warren A. Sklar
Attorney—Wenderoth, Lind & Ponack ABSTRACT: A spot photometric device and an average photometric device are installed in a single camera and provided with a changeover device for switching one photometric device on and the other off and an indicating device for visually indicating in the finder which of the photometric devices is on.

PATENTED OCT 12 1971 3,612,703

KUNIO IRISAWA
AND KAZUO SAITA
INVENTORS

BY *Wenderoth, Lind & Ponack.*
ATTORNEYS

PATENTED OCT 12 1971 3,612,703
SHEET 2 OF 2

KUNIO IRISAWA
AND KAZUO SAITA
INVENTORS

BY Wenderoth Lind & Ponack
ATTORNEYS 3,612,703

COMBINED SPOT AND AVERAGE PHOTOMETRIC SYSTEM

BACKGROUND OF THE INVENTION

This invention relates generally to the field of optical instruments and photometry. More particularly, the invention concerns a combined photometric system having two different photometric devices, a changeover device for switching from one photometric device to the other, and an indicating device for indicating in a finder which of the photometric devices is operative.

In certain optical instruments such as a photographic camera, it is preferable to measure the intensity of the light which has passed through the lens system to determine the degree of exposure to which the instrument is to be adjusted. For this purpose, in a single-lens reflex camera, for example, there is a device wherein a light-receiving sensor is mounted on an upper part of the reflecting mirror to measure the incoming light in the vicinity of a specific position of the picture plane (that is, a so-called spot photometric device) and a device wherein a light-receiving sensor is positioned to the rear of the finder prism to measure the incoming light in an averaging manner over the entire picture plane (that is, a so-called average photometric device).

It is quite possible to install two different photometric devices as mentioned above in one optical instrument and to provide switching means for changing over or switching from one system to the other. In such cases it is imperative that the operator known positively, without error, the operative states of the systems, that is, which system is operative, preferably by an indication in a readily and conveniently observable point.

SUMMARY OF THE INVENTION

It is an object of the present invention to provide, in an optical instrument such as a photographic camera having a finder, two photometric devices of different kinds, means for switching from one system to the other, and a device for visually indicating, within the finder, which of the two photometric devices is operative.

Another object of the invention is to provide a device of the above-stated character which has a simple organization and a simple operation.

According to the present invention, briefly summarized, there is provided, in an optical instrument having a finder, a photometric system characterized by the combination of a spot photometric device including a first circuit for operation thereof, an average photometric device including a second circuit for operation thereof, a changeover switch for switching action to render either of the first and second circuits operative and the other inoperative, and indicating means coupled to and operated by the changeover switch to indicate in the field of vision of the finder the identity of the photometric device in operative state.

BRIEF DESCRIPTION OF THE DRAWING

The nature, details, and utility of the invention will be more clearly apparent from the following detailed description with respect to preferred embodiments of the invention when read in conjunction with the accompanying drawing, in which like parts are designated by like reference numerals.

In the drawing.

DETAILED DESCRIPTION

Figure 1:
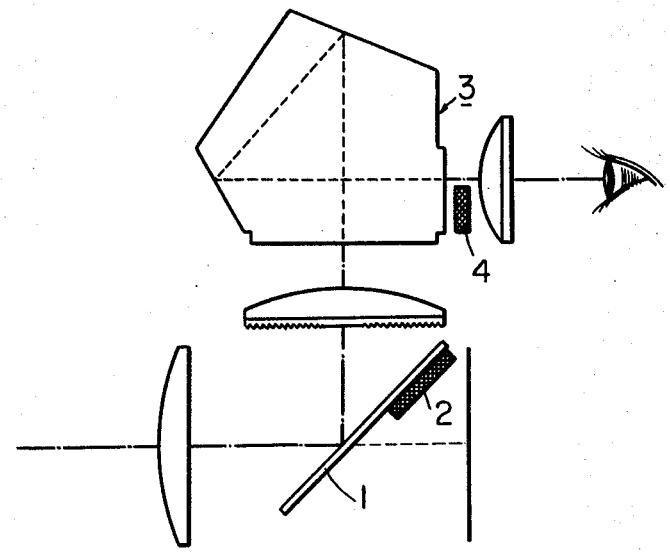
FIG. 1 is a diagrammatic view, in side elevation, showing an example of the lens system and finder system of a single-lens reflex camera.

FIG. 1 illustrates the optical system of one example of a single-lens reflex camera in which a light-receiving sensor 2 is installed on an upper part of the mirror 1 for a spot photometric device, and another light-receiving sensor 4 is installed behind the finder system 3 for an average photometric device. As mentioned hereinbefore, the spot photometric system is for measuring the incoming light in the vicinity of a specific position of the picture plane, while the average photometric system is for measuring the average incoming light over the entire picture plane.

Figure 6:
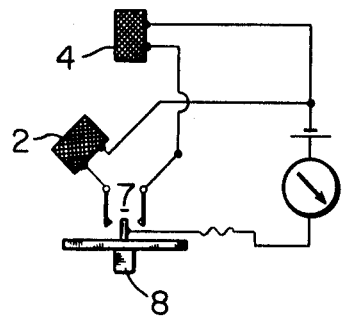
FIG. 6 is a schematic diagram showing one example of operative circuits of spot and average photometric devices with a changeover switch for switching the operation from one device to the other.

According to the invention, both of these two photometric systems are installed in the camera, which illustrates one example of an optical instrument to which the invention is applicable, and means including a switch 7 and a switch knob 8 as illustrated by one example in FIG. 6 are provided to switch from one photometric device to the other. The invention further provides a device for visually indicating within the finder which of the photometric systems is operative, which device may take many forms as illustrated by the following preferred embodiments of the invention.

Figure 2:
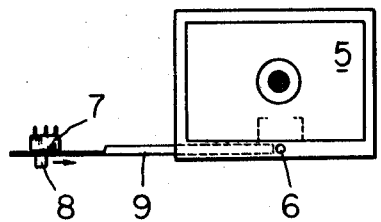
FIGS. 2 through 5, inclusive, are diagrammatic views respectively showing different examples of embodiments of the invention.

In one embodiment of the invention as illustrated in FIG. 2, a small light-transmitting aperture 6 is provided at the lower edge of the field of the finder 5 of a camera. When this aperture 6 is visible, it indicates that the spot photometric device is operative. The aperture 6 is overlappingly covered to make it invisible and uncovered to make it visible by a one end of a switch bar 9 coupled at its other end to the switch knob 8 of the switch 7 for switching and causing either of the circuits of the light sensor 2 for spot photometry and the light sensor 4 for average photometry to assume the operative state.

Thus, when the movable contact of switch 7 is in the spot photometry position, the switch bar 9 is in its retracted position toward the left as viewed in FIG. 2 to expose aperture 6, which is then clearly visible when viewed through the finder. On the other hand, when the switch 7 is to be switched to the average photometry position, the switch knob 8 is shifted toward the right (as viewed in FIG. 2), whereby the switch bar 9 is shifted to the right and shields off the aperture 6 from view. Consequently, the aperture 6 becomes invisible when the field of the finder 5 is viewed. Thus, when the operator looks into the finder and can see the aperture 6, he is informed that the spot photometry system is operative, and when he cannot see the aperture, he knows that the average photometry system is operative.

Figure 3:
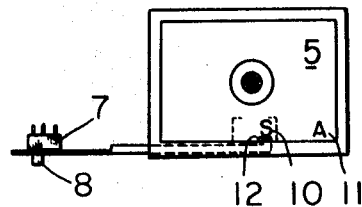

In a second embodiment of the invention as illustrated in FIG. 3, a symbol or mark 10 indicating spot photometry and a mark 11 indicating average photometry are provided on the lower edge of the field of the finder 5, and an indicating pointer 12 is fixed to the right extremity of a switch bar 9 similar to that in the aforedescribed first example. Thus, by pushing knob 8 to the left or to the right, the pointer 12 is caused to point to mark 10 or mark 11, whereby, when the operator looks into the finder, he can detect by the position of the pointer 12 which of the spot photometric and average photometric devices is operative.

Figure 4:
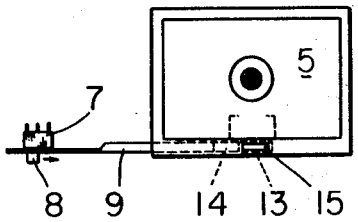

In a third embodiment of the invention as illustrated in FIG. 4, two plates 13 and 14 of mutually different color in side-by-side arrangement are fixed to the extremity of a switch bar 9 similar to those in the above-described first and second examples. For example, the plate 13 at the extreme right side (as viewed in FIG. 4) is colored red, while the adjacent plate 14 to the left thereof is colored blue. A window 15 is provided at the lower edge of the field of the finder 5 to reveal either of the colored plates 13 or 14 depending on the direction in which switch bar 9 is shifted by means of the knob 8. Thus, when the operator looks into the finder 5, the appearance of the red or blue plate informs him that the spot or average photometric system is operative.

Figure 5:
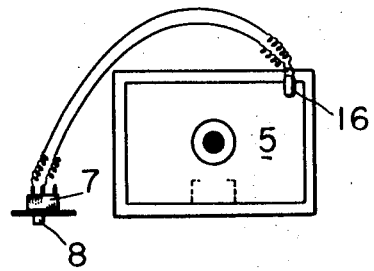

In a fourth embodiment of the invention as illustrated in FIG. 5, a miniature lamp 16 is mounted in one corner of the field of the finder 5 and electrically connected to the switch 7 so that when the knob 8 is shifted to the left, the circuit of the lamp 16 is closed to light the lamp, and when the knob is shifted to the right, the circuit is opened to extinguish the lamp. Thus, when the operator looks into the finder to find the lamp 16 in lighted state, he is informed that the spot photometric system is operative, and when the lamp 16 is in extinguished state, he is informed that the average photometric system is operative.

Figure 7:
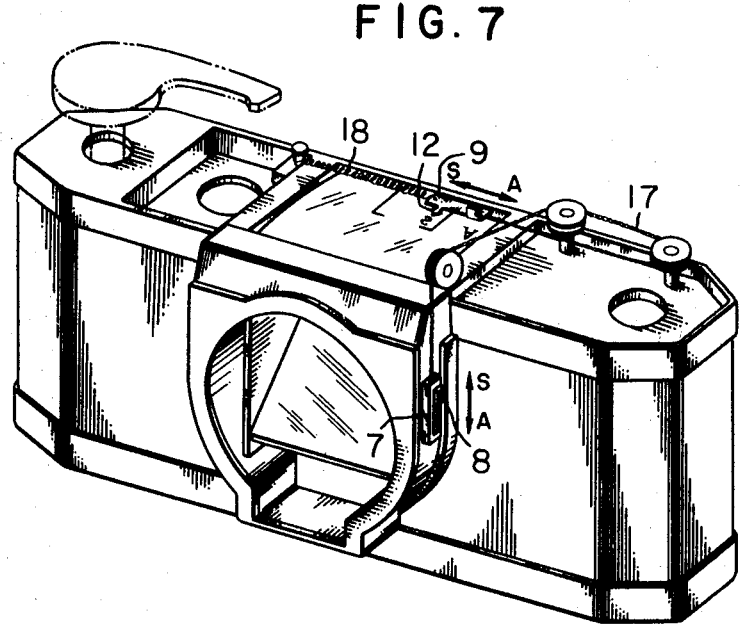
FIG. 7 is a perspective view of a single-lens reflex camera without finder prism illustrating one example of practical application of the invention.

The above-described embodiments of the invention can all be applied practically to optical instruments such as cameras by simple known means. For example, the embodiment of the invention illustrated in FIG. 3 can be applied to a single-lens reflex camera as illustrated in FIG. 7. In this example, the movements of the knob 8 of switch 7 are transmitted by way of a chain 17 passed over suitable fairleads to a switch bar 9 to which the pointer 12 is fixed. A return spring 18 is stretched between the extreme end of the switch bar 9 and a part of the camera housing.

As described above, the present invention provides, in an optical instrument, a combined photometric system in which spot and average photometric systems are interswitchably installed, and the identity of the photometric system in operative state is indicated in the finder. Thus, great convenience is afforded in determining, without error, the degree of exposure corresponding to the photographic state of a camera, for example.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claims.

I claim:

1. In an optical instrument for measuring the spot or average light quantity of a single-lens reflex camera having a view finder to determine a picture plane, said optical instrument comprising in combination, a spot photoelectric device including a first light-receiving photocell positioned to receive incoming light in the vicinity of a specific position of the picture plane, an average photoelectric device including a second light-receiving photocell positioned to receive average incoming light over the entire picture plane, and a circuit including said first and second photocells and a meter, the improvement comprising means in said circuit to connect the first and second photocells such that only one of said photocells is electrically connected to said meter at a given time, said means comprising a single manual changeover switch connected to said circuit for selectively connecting either one of said photocells to said meter, and indicating means positioned in said view finder and coupled to and operated by said switch for indicating which of said photocells is connected to said meter.